(12) United States Patent
Nakamoto et al.

(10) Patent No.: US 8,994,493 B2
(45) Date of Patent: Mar. 31, 2015

(54) CONTROL NETWORK SYSTEM

(75) Inventors: Yasuyuki Nakamoto, Tokyo (JP);
Hideki Umemoto, Tokyo (JP);
Toshiyuki Emori, Tokyo (JP); Hiroshi Mori, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 803 days.

(21) Appl. No.: 13/014,262

(22) Filed: Jan. 26, 2011

(65) Prior Publication Data

US 2011/0187490 A1 Aug. 4, 2011

(30) Foreign Application Priority Data

Jan. 29, 2010 (JP) ................................. 2010-017544

(51) Int. Cl.
*G05B 23/02* (2006.01)
*G05B 19/418* (2006.01)

(52) U.S. Cl.
CPC .... *G05B 19/418* (2013.01); *G05B 2219/23297* (2013.01); *G05B 2219/25428* (2013.01); *G05B 2219/31131* (2013.01); *G05B 2219/31211* (2013.01)
USPC .............. 340/3.9; 340/3.1; 340/1.1; 715/735; 715/733; 709/208; 709/209; 709/223; 709/226

(58) Field of Classification Search
USPC ...................... 340/3.9, 3.1, 1.1; 715/735, 733; 709/208, 209, 223, 226
See application file for complete search history.

(56) References Cited

U.S. PATENT DOCUMENTS

| | | | | |
|---|---|---|---|---|
| 5,962,991 A | * | 10/1999 | Levy | 315/312 |
| 6,008,733 A | * | 12/1999 | Okano et al. | 340/3.54 |
| 6,553,439 B1 | * | 4/2003 | Greger et al. | 710/62 |
| 2004/0199364 A1 | * | 10/2004 | Law et al. | 702/189 |

(Continued)

FOREIGN PATENT DOCUMENTS

| | | |
|---|---|---|
| GB | 2 403 043 A | 12/2004 |
| JP | 2004-128785 A | 4/2004 |

(Continued)

OTHER PUBLICATIONS

Japanese Office Action dated Jan. 5, 2012, issued in corresponding Japanese Patent Application No. 2010-017544 (2 pages).

(Continued)

*Primary Examiner* — George Bugg
*Assistant Examiner* — Naomi Small
(74) *Attorney, Agent, or Firm* — Westerman, Hattori, Daniels & Adrian, LLP

(57) ABSTRACT

A control network system may control a control target by using control data. The control network system may include a wireless field device that transmits the control data through a wireless communication, a relay apparatus that relays the control data from the wireless field device, the relay apparatus including a storage unit that stores identification data of the wireless field device, the storage unit storing a flag associated with the identification data, the flag showing a progress state of commissioning of the wireless field device, and a host system that receives the control data from the wireless field device through the relay apparatus, the host system including a control unit that discontinues operation of controlling the control target when the flag is in a nonsteady state.

20 Claims, 3 Drawing Sheets

(56) References Cited

U.S. PATENT DOCUMENTS

| | | | |
|---|---|---|---|
| 2006/0255961 A1* | 11/2006 | Hofer et al. | 340/825.22 |
| 2007/0290872 A1* | 12/2007 | Yamada et al. | 340/655 |
| 2008/0273518 A1 | 11/2008 | Pratt et al. | |
| 2009/0249063 A1* | 10/2009 | Sakurai et al. | 713/159 |
| 2009/0267540 A1* | 10/2009 | Chemel et al. | 315/297 |
| 2009/0300172 A1* | 12/2009 | Hayashi et al. | 709/224 |
| 2010/0107007 A1* | 4/2010 | Grohman et al. | 714/15 |
| 2010/0107083 A1* | 4/2010 | Grohman | 715/735 |
| 2010/0107112 A1* | 4/2010 | Jennings et al. | 715/777 |
| 2010/0177684 A1* | 7/2010 | Kore et al. | 370/328 |
| 2010/0179696 A1* | 7/2010 | Grohman et al. | 700/276 |
| 2011/0004685 A1* | 1/2011 | De Groot et al. | 709/225 |
| 2011/0068921 A1* | 3/2011 | Shafer | 340/571 |

FOREIGN PATENT DOCUMENTS

| | | |
|---|---|---|
| JP | 2006-060696 A | 3/2006 |
| JP | 2010-011273 A | 1/2010 |

OTHER PUBLICATIONS

Extended European Search Report dated Jan. 21, 2013, issued in corresponding European Patent Application No. 11151922.9 (8 pages).

Control with WirelessHART(URL:http://www.hartcomm.org/protocol/training/resources/wiHART_resources/Control_with_WirlessHART.pdf), published Mar. 5, 2010, cited in spec.

ISA100.11a-2009 "Wireless system for industrial automation. Process control and related application", pp. 1-817, cited in spec.

* cited by examiner

US 8,994,493 B2

CONTROL NETWORK SYSTEM

BACKGROUND OF THE INVENTION

1. Field of the Invention

The present invention relates to a control network system that controls a control object by a host system acquiring control data that is transmitted by a wireless field device in a wireless communication through a relay unit. More specifically, the present invention relates to a reduction of influence to a process by a wireless field device in commissioning.

Priority is claimed on Japanese Patent Application No. 2010-017544, filed Jan. 29, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, when a commissioning of the wireless field device connected to a distributed control system in a wireline connection is performed, adjustment/confirmation of the wireless field device is completed before the wireless field device is connected to the distributed control system. In other words, "confirmation before installation" is performed. Then, after the wireless field device is connected to the distributed control system, a final confirmation such as a feedback control loop check of PID control etc. is performed. The wireline connection is performed by an analog transmission as using a 4-20 mA analog signal or a digital transmission in accordance with the standard by the fieldbus association. The final confirmation is hereinafter referred to as commissioning.

In addition, for example, there are various wireless field devices such as a differential pressure gauge, a flowmeter, a thermometer, a monitor camera, an actuator, and a controller.

Recently, in the field of process control, technology to change a wireline transmission path to a wireless communication has been established. In particular, a constitution to connect a wireless field device by using a wireless transmission system represented by the ISA100.11a standard is examined. A wireless field device performing wireless communication in the above-described way is hereinafter referred to as a wireless field device. For example, a process control system of industrial automation is constituted by using a wireless control network system that includes a wireless field device. The conventional control system is constituted as a wireline network. Therefore, there is a limitation in communication distance and a limitation in guidance of wiring. Therefore, the sensor measuring temperature or flow quantity cannot be installed in the most suitable position in a plant. In addition, control precision is decreased.

As a wireless communication standard, wireless HART and a wireless communication standard for process control, ISA100.11a are examined. Wireless HART is regulated in HART (Highway Addressable Remote Transducer) 7. ISA100.11a was approved in ISA100 committee of ISA (International Society of Automation). WirelessHART and ISA100.11a are protocols/standards of wireless communication for industry to perform frequency division communication. "Wireless systems for industrial automation: Process control and related applications" discloses the contents of decisions of the above-described communications. Also, control with WirelessHART (URL: http://www.hartcomm.org/protocol/training/resources/wiHART_resources/Control_with_WirelessHART.pdf) discloses the contents of decisions of the above-described communications.

Various wireless field devices are used as a field-set instrument in a process control system and a wireless control network system. There are wireless field devices such as a sensor or a control instrument measuring various physical quantities such as temperature, pressure, and flow quantity used in a measurement control field in the process control system.

Japanese Unexamined Patent Application, First Publication No. 2004-128785 discloses the above-described control network system.

In a conventional control network system that uses a wireline connection, even if one wireless field device has adjustment defects, influence of the adjustment defects to the plant can be prevented by detaching the wireless field device having adjustment defects. In a conventional control network system that uses a wireless connection, even if one wireless field device has adjustment defects, it is not easy to separate the wireless field device that is connected from the network. In adjustment confirmation before installation, a wireless network can be divided logically by using a network ID that is different from a network ID in the plant operation. A change of the network ID needs re-setting of the network ID to the wireless field device. The final confirmed state in the commissioning after connection needs to be reconfirmed. Because a different network is adjacent, wireless electric wave interference occurs, and performance decline that is different from the normal state may occur. The process is influenced by this performance decline. When connected using the same network ID, the process is influenced by the wireless field device of the non-steady state in the commissioning.

SUMMARY

A control network system may control a control target by using control data. The control network system may include a wireless field device that transmits the control data through a wireless communication, a relay apparatus that relays the control data from the wireless field device, the relay apparatus including a storage unit that stores identification data of the wireless field device, the storage unit storing a flag associated with the identification data, the flag showing a progress state of commissioning of the wireless field device, and a host system that receives the control data from the wireless field device through the relay apparatus, the host system including a control unit that discontinues operation of controlling the control target when the flag is in a nonsteady state.

A control network system may control a control target by using control data. The control network system may include a plural set of wireless field devices, each set comprising one or more wireless field devices, each of which transmits the control data through a wireless communication, a plurality of relay apparatuses, each of which relays the control data from a corresponding set of the one or more wireless field devices, each of the plurality of relay apparatuses comprising a storage unit that stores identification data of the wireless field device, the storage unit storing a flag associated with the identification data, the flag showing a progress state of commissioning of the wireless field device, and a host system that is connected to the plurality of relay apparatuses through a network, the host system receiving the control data from the wireless field device through a corresponding one of the plurality of relay apparatuses, the host system comprising a control unit that discontinues operation of controlling the control target when the flag is in a nonsteady state.

A control method may control a control target by using control data. The control data may be transmitted by a wireless field device through a wireless communication. The control method may include acquiring identification data of the wireless field device, generating a flag associated with the identification data, the flag showing a progress state of commissioning of the wireless field device, and discontinuing operation of controlling the control target when the flag is in a nonsteady state.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

Figure 1:
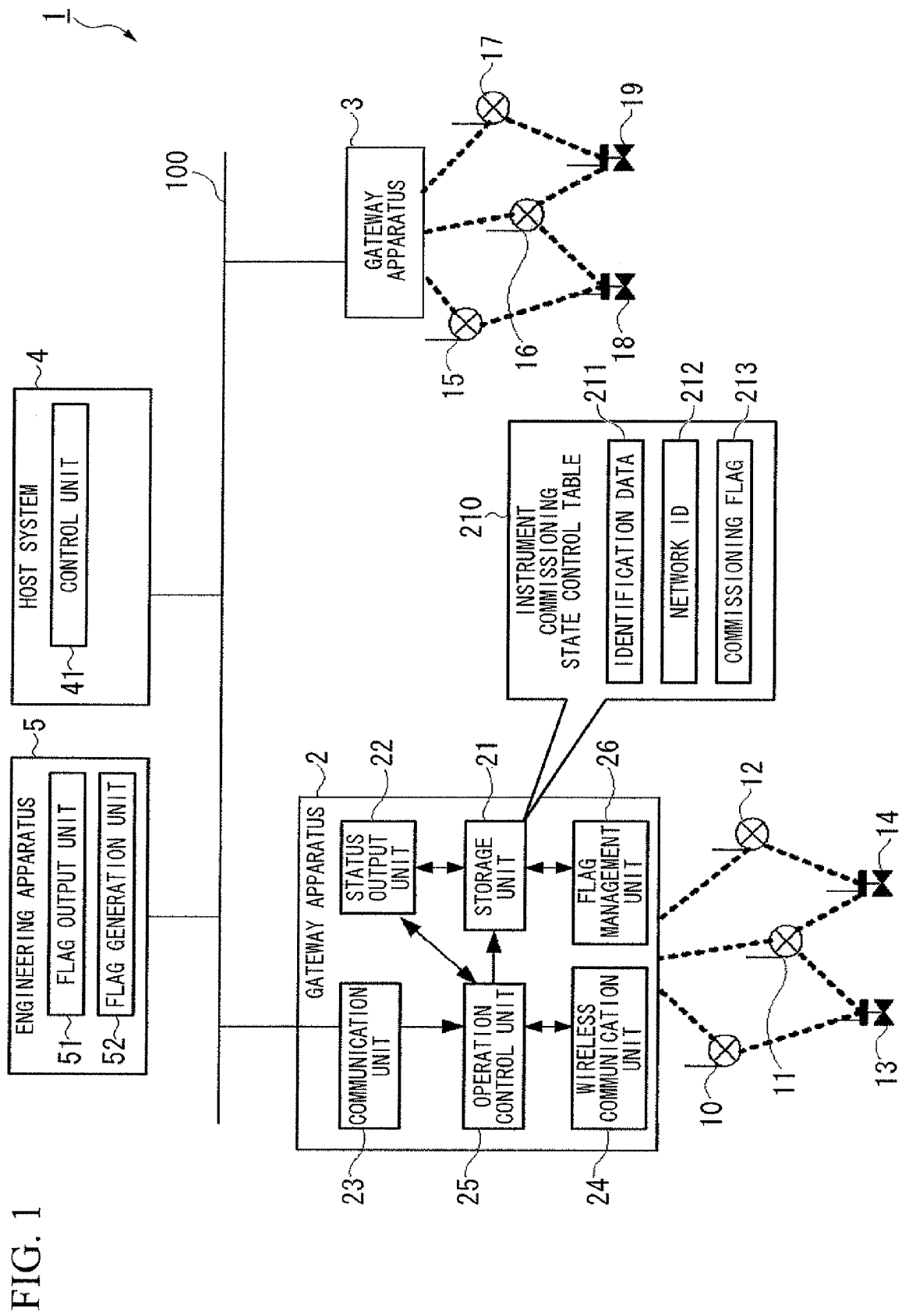
FIG. 1 is a view illustrating a configuration of a control network system in accordance with a first preferred embodiment of the present invention.

The present invention will be now described herein with reference to illustrative embodiments. Those skilled in the art will recognize that many alternative embodiments can be accomplished using the teaching of the present invention and that the present invention is not limited to the embodiments illustrated herein for explanatory purposes.

A control network system may control a control target by using control data. The control network system may include a wireless field device that transmits the control data through a wireless communication, a relay apparatus that relays the control data from the wireless field device, the relay apparatus including a storage unit that stores identification data of the wireless field device, the storage unit storing a flag associated with the identification data, the flag showing a progress state of commissioning of the wireless field device, and a host system that receives the control data from the wireless field device through the relay apparatus, the host system including a control unit that discontinues operation of controlling the control target when the flag is in a nonsteady state.

The relay apparatus may further include a status output unit, and a communication unit. If the host system receives access request information, which is output from the host system so as to acquire the control data, then the status output unit may outputs status information of the control data, which is acquired by the host system based on the access request information, the status information being in the nonsteady state corresponding to the flag of the wireless field device. The communication unit may output the control data and the status information of the wireless field device associated with the control data to the host system.

The flag may be one of a nonsteady state flag and a steady state flag. The nonsteady state flag may show that the wireless field device is under commissioning. The steady state flag may show that the wireless field device has finished commissioning.

The control network system may further include a flag output unit that outputs one of nonsteady flag information and steady flag information, the nonsteady flag information turning the flag to the nonsteady state flag, the steady flag information turning the flag to the steady state flag, and a flag generation unit that generates the nonsteady flag information before the wireless field device starts commissioning, the flag generation unit generating the steady flag information when the wireless field device has finished commissioning.

The relay apparatus may further include an input unit that receives the nonsteady flag information before the wireless field device starts commissioning, the input unit receiving the steady flag information when the wireless field device has finished commissioning.

The relay apparatus may further include a flag management unit that turns the flag of the wireless field device to the nonsteady state flag when receiving the nonsteady flag information, the flag management unit turning the flag of the wireless field device to the steady state flag when receiving the steady flag information, the flag management unit controlling one of the nonsteady state flag and the steady state flag to be stored in the storage unit associated with the identification data of the wireless field device.

The control unit may control the control target based on the control data when status information of the control data, which has been received, is in a steady state.

The storage unit may store process data associated with the identification data and the nonsteady state flag, the process data having been acquired when the wireless field device is under commissioning. The communication unit may transmit the status information and the process data to the host system.

A control network system may control a control target by using control data. The control network system may include a plural set of wireless field devices, each set comprising one or more wireless field devices, each of which transmits the control data through a wireless communication, a plurality of relay apparatuses, each of which relays the control data from a corresponding set of the one or more wireless field devices, each of the plurality of relay apparatuses comprising a storage unit that stores identification data of the wireless field device, the storage unit storing a flag associated with the identification data, the flag showing a progress state of commissioning of the wireless field device, and a host system that is connected to the plurality of relay apparatuses through a network, the host system receiving the control data from the wireless field device through a corresponding one of the plurality of relay apparatuses, the host system comprising a control unit that discontinues operation of controlling the control target when the flag is in a nonsteady state.

The relay apparatus may further include a status output unit, and a communication unit. If the host system receives access request information, which is output from the host system so as to acquire the control data, then the status output unit may outputs status information of the control data, which is acquired by the host system based on the access request information, the status information being in the nonsteady state corresponding to the flag of the wireless field device. The communication unit may output the control data and the status information of the wireless field device associated with the control data to the host system.

The flag may be one of a nonsteady state flag and a steady state flag. The nonsteady state flag may show that the wireless field device is under commissioning. The steady state flag may show that the wireless field device has finished commissioning.

The control network system may further include a flag output unit that outputs one of nonsteady flag information and steady flag information, the nonsteady flag information turning the flag to the nonsteady state flag, the steady flag information turning the flag to the steady state flag, and a flag generation unit that generates the nonsteady flag information before the wireless field device starts commissioning, the flag generation unit generating the steady flag information when the wireless field device has finished commissioning.

The relay apparatus may further include an input unit that receives the nonsteady flag information before the wireless field device starts commissioning, the input unit receiving the steady flag information when the wireless field device has finished commissioning.

The relay apparatus may further include a flag management unit that turns the flag of the wireless field device to the nonsteady state flag when receiving the nonsteady flag information, the flag management unit turning the flag of the wireless field device to the steady state flag when receiving the steady flag information, the flag management unit controlling one of the nonsteady state flag and the steady state flag to be stored in the storage unit associated with the identification data of the wireless field device.

The control unit may control the control target based on the control data when status information of the control data, which has been received, is in a steady state.

The storage unit may store process data associated with the identification data and the nonsteady state flag, the process data having been acquired when the wireless field device is under commissioning. The communication unit may transmit the status information and the process data to the host system.

A control method may control a control target by using control data. The control data may be transmitted by a wireless field device through a wireless communication. The control method may include acquiring identification data of the wireless field device, generating a flag associated with the identification data, the flag showing a progress state of commissioning of the wireless field device, and discontinuing operation of controlling the control target when the flag is in a nonsteady state.

The flag may be one of a nonsteady state flag and a steady state flag. The nonsteady state flag may show that the wireless field device is under commissioning. The steady state flag may show that the wireless field device has finished commissioning.

The control method may further include generating nonsteady flag information before the wireless field device starts commissioning, the nonsteady flag information turning the flag to the nonsteady state flag, and generating steady flag information when the wireless field device has finished commissioning, the steady flag information turning the flag to the steady state flag.

The control method may further include turning the flag of the wireless field device to the nonsteady state flag when receiving the nonsteady flag information, and turning the flag of the wireless field device to the steady state flag when receiving the steady flag information.

The control network system in accordance with the preferred embodiments of the present invention reduces the effect by the wireless field device on the process that is in adjustment or in commissioning, i.e. a non-steady state.

The control network system in accordance with the preferred embodiments of the present invention includes a storage unit, which stores identification data of a wireless field device and stores a commissioning flag that shows the progress state in commissioning of the wireless field device associated with the identification data, and a control unit, which discontinues operation of control of the control target if the commissioning flag of the wireless field device associated with the control data is in nonsteady state. Thereby, effect by the wireless field device, which is in commissioning, on the process can be reduced. In the control network system in accordance with the preferred embodiments of the present invention, indefinite data transmission by an unsuitable setting can be prevented according to the process in which completion of commissioning is expressly shown.

In the control network system in accordance with the preferred embodiments of the present invention, an effect by the wireless field device, which is in a nonsteady state while commissioning, on the process can be reduced even if the network IDs of the wireless networks, which the wireless field devices joins before and after the commissioning, are the same.

In the control network system in accordance with the preferred embodiments of the present invention, the network IDs, which the wireless field devices joins before and after the commissioning, are not necessarily different. Thereby, an effect by radio wave interference, which is caused by adjacent networks, such as a deficiency of abnormal performance can be reduced.

In the control network system in accordance with the preferred embodiments of the present invention, the storage unit stores identification data of a wireless field device and stores a commissioning flag that shows the progress state in commissioning of the wireless field device associated with the identification data. If the commissioning flag of the wireless field device, which associates with the control data, is in a nonsteady state, then the control unit discontinues operation of control of the control target.

Specifically, a relay unit includes the storage unit, a status output unit, and a communication unit. The storage unit stores the identification data of the wireless field device and stores the commissioning flag that shows the progress state in commissioning of the wireless field device associated with the identification data. If the status output unit receives access request information, which is transmitted by the host system to acquire the control data, then the status output unit makes status information of the control data, which is output from the wireless field device, steady state or nonsteady state, based on the commissioning flag of the wireless field devices. The status information of the control data is the address of the access request information. The communication unit transmits to the host system both the control data and the status information of the wireless field device associated with the control data. The host system includes a control unit. If the commissioning flag of the wireless field device associated with the control data is in a nonsteady state, then the control unit discontinues operation of control of the control target. Only when the status information of the received control data is in a steady state, the control unit controls the control target based on the control data.

First Preferred Embodiment:

A first preferred embodiment of the present invention will be described. FIG. 1 is a view illustrating a configuration of a control network system 1 in accordance with the first preferred embodiment of the present invention. The control network system 1 includes wireless field devices 10, . . . , 19, gateway apparatuses 2 and 3, and a host system 4. The gateway apparatuses 2 and 3 are connected to the host system 4 through a network 100.

The wireless field devices 10, . . . , 19 have sensor function or actuator function, for example. The sensor function of the wireless field device measures physical quantities such as temperature and flow volume. The actuator function of the wireless field device controls a control valve. The wireless field devices 10, . . . , 19 transmit various data by using a wireless communication such as ISA 100.11a and Wireless HART that perform frequency hopping. The various data that are transmitted are, for example, various measurement data and control data for process control such as result of adjusting a control target. The control data may be cascade data that are transmitted between function blocks of the wireless field devices.

The gateway apparatus 2 performs a wireless communication with the wireless field devices 10, . . . , 14 by using ISA 100.11a, Wireless HART, etc. The gateway apparatus 2 relays communication data from the wireless field devices 10, . . . , 14 through a wired network such as Ethernet. The gateway apparatus 2 includes a storage unit 21, a status output unit 22, a communication unit 23, a wireless communication unit 24, and an operation control unit 25. The storage unit 21 includes an instrument commissioning state control table 210. The instrument commissioning state control table 210 stores identification data 211 of the wireless field device, a network ID 212, and a commissioning flag 213 that shows the progress state in commissioning of the wireless field device associated with the identification data.

The gateway apparatus 3 performs a wireless communication with the wireless field devices 15, . . . , 19 by using ISA 100.11a, Wireless HART, etc. The gateway apparatus 3 relays communication data from the wireless field devices 15, . . . , 19 through a wired network such as Ethernet. The gateway apparatus 3 has the same configuration as the gateway apparatus 2.

The host system 4 receives the control data including the measurement data from the wireless field devices 10, . . . , 19 through the gateway apparatuses 2 and 3. The host system 4 outputs the control data to control the wireless field devices 10, . . . , 19 through the gateway apparatuses 2 and 3.

The commissioning flag may be a steady state flag or a nonsteady state flag.

The control network system in accordance with the first preferred embodiment of the present invention may include an engineering apparatus 5. The engineering apparatus 5 is connected to the gateway apparatuses 2 and 3 and the host system 4 through the network 100. The engineering apparatus 5 includes a flag output unit 51 and a flag generation unit 52.

The flag output unit 51 transmits nonsteady flag information or steady flag information that is stored in the instrument commissioning state control table 211. The nonsteady flag information turns the commissioning flag to the nonsteady state flag. The steady flag information turns the commissioning flag to the steady state flag.

The flag generation unit 52 generates the nonsteady flag information before the operation of commissioning of the wireless field device. The flag generation unit 52 generates the steady flag information after the operation of commissioning of the wireless field device.

Connection and Arrangement

The gateway apparatus 2 is connected to the wireless field devices 10, 11 and 12 through wireless communication. The wireless field device 13 is connected to the wireless field devices 10 and 11. The wireless field device 14 is connected to the wireless field devices 11 and 12.

The gateway apparatus 3 is connected to the wireless field devices 15, 16 and 17 through wireless communication. The wireless field device 18 is connected to the wireless field devices 15 and 16. The wireless field device 19 is connected to the wireless field devices 16 and 17.

The host system 4 is connected to the gateway apparatuses 2 and 3 through the network 100 that is a wired network such as Ethernet. The host system 4 outputs and receives various data such as control data and access request information to/from the gateway apparatuses 2 and 3.

The engineering apparatus 5 is connected to the gateway apparatuses 2 and 3 through the network 100. The engineering apparatus 5 outputs and receives the steady flag information and the nonsteady flag information to/from the gateway apparatuses 2 and 3.

Main Components

The wireless field devices 10, . . . , 19 have sensor function or actuator function, for example. The sensor function of the wireless field device measures physical quantities such as temperature and flow volume. The actuator function of the wireless field device controls a control valve. The wireless field devices 10, . . . , 19 transmits various measurement data, based on a prescribed control process, by using a wireless communication such as ISA 100.11 a that perform frequency hopping.

The wireless field devices 10, . . . , 19 operate based on a wireless communication standard such as ISA 100.11a. When the wireless field devices 10, . . . , 19 enter the wireless network including a plurality of wireless field devices, the wireless field devices 10, . . . , 19 output a network ID and a join key to a system manager apparatus, which is not illustrated in the figure, through the gateway apparatuses 2 and 3 so as to request the system manager apparatus to certify the wireless field device.

The system manager apparatus determines whether or not the wireless field device that is requested to certify is the wireless field device that has been registered in the system manager apparatus, based on the network ID and the join key that are received. If the system manager apparatus determines that the wireless field device that is requested to certify is the wireless field device that has been registered in the system manager apparatus, then the system manager apparatus outputs a reply to admit the wireless field device joining the wireless network. Then the wireless field device can join the wireless network.

The system manager apparatus may be connected to the gateway apparatuses 2 and 3 through the network 100. The system manager apparatus may be connected to the gateway apparatuses 2 and 3 through a wireless communication.

The gateway apparatus 2 performs wireless communications with each of the wireless field devices 10, . . . , 14. The gateway apparatus 2 performs a wireless communication with the host system 4 through the network 100. The gateway apparatus 2 relays and transmits communication data such as the access request information, which is received from the host system 4, to the wireless field devices 10, . . . , 14 by using a wireless communication. The apparatus 2 relays and transmits the data, which is received through the wireless communication, to the host system 4 thorough the network 100.

The gateway apparatus 3 performs wireless communications with each of the wireless field devices 15, . . . , 19. The gateway apparatus 3 performs a wireless communication with the host system 4 through the network 100. The gateway apparatus 3 relays and transmits the communication data such as the access request information, which is received from the host system 4, to the wireless field devices 15, . . . , 19 by using a wireless communication. The apparatus 3 relays and transmits the data, which is received through the wireless communication, to the host system 4 thorough the network 100.

The gateway apparatus 2 includes the storage unit 21, the status output unit 22, the communication unit 23, the wireless communication unit 24, and the operation control unit 25.

The storage unit 21 is mainly a RAM (Random Access Memory) or a ROM (Read Only Memory), for example. The storage unit 21 stores the instrument commissioning state control table 210. The instrument commissioning state control table 210 stores route information to the host system 4, route information of the wireless field devices 10, . . . , 14, identification data of the wireless field device, and the commissioning flag associated with the route information and the identification data. The commissioning flag shows the progress state in commissioning of the wireless field device.

The host system 4 outputs the access request information to the wireless field devices in order to acquire the control data. If the status output unit 22 receives the access request information, then the status output unit 22 turns the status information of the control data from the wireless field device, which is requested by the access request information, into steady state or nonsteady state based on the commissioning flag of the wireless field device.

The communication unit 23 outputs the control data or both the control data and the status information of the wireless field device corresponding to the control data to the host system 4.

The wireless communication unit 24 outputs and receives the data to/from the wireless field devices 10, . . . , 14 by using the wireless communication.

The operation control unit 25 is a CPU (Central Processing Unit), for example. The operation control unit 25 controls various functions of the gateway apparatus 2 or operations of each component of the gateway apparatus 2.

The instrument commissioning state control table 210 includes the identification data 211, the network ID 212, and the commissioning flag 213. The identification data 211 identifies the wireless field devices and is unique corresponding to each wireless field device. The network ID 212 is to identify the wireless network that the wireless field devices join. The network ID 212 may be a parameter "EUI_64" that is defined by the ISA 100.11a standard, for example.

The host system 4 outputs the access request information to the wireless field devices in order to acquire the control data that is transmitted by using a control communication on the wireless network. The control communication is generally called as a publisher/subscriber communication. The status output unit 22 receives the access request information. If the commissioning flag of the wireless field device that is requested by the access request information is in a nonsteady state, then the status output unit 22 turns the status information of the control data from the wireless field device into a nonsteady state.

If the commissioning flag of the wireless field device that is requested by the access request information is in a steady state, then the status output unit 22 may turn the status information of the control data from the wireless field device into a steady state.

The network ID is transmitted to the system manager apparatus when the wireless field device joins the wireless network. The operation control unit 25 registers and stores the network ID and the identification data of the wireless field device in the instrument commissioning state control table 210. The operation control unit 25 registers and stores the commissioning flag as a nonsteady state flag. The nonsteady state flag means that the wireless field device is under commissioning. Then the operation control unit 25 initializes the instrument commissioning state control table 210.

In the process of engineering, the nonsteady state flag may not be registered in the instrument commissioning state control table 210. The nonsteady state flag means that the wireless field device is under commissioning when the wireless field device is registered. In this case, the operation control unit 25 turns the commissioning flag to the steady state flag based on the steady flag information, the identification data of the wireless field device, etc. before commissioning of the wireless field device. The steady flag information is output by the flag output unit 51. The steady flag information turns the commissioning flag to the steady state flag. The steady state flag means that the commissioning has been finished.

The engineering apparatus 5 is operated and used by an operator. The engineering apparatus 5 outputs the nonsteady flag information. If the operation control unit 25 receives the nonsteady flag information, then the operation control unit 25 turns the commissioning flag to the nonsteady state flag. Specifically, the operation control unit 25 turns the commissioning flag of the wireless field device to the nonsteady state flag, based on the nonsteady flag information, the identification data of the wireless field device, etc. The nonsteady flag information is output from the flag output unit 51. The nonsteady flag information turns the commissioning flag to the nonsteady state flag.

The operation control unit 25 relays, transmits, and passes the communication data, which is used to confirm the commissioning status and the operation of the wireless field device, when at least one of the wireless field devices included in the wireless network is under commissioning. This communication is a "Read communication" that is generally called an on-demand communication.

The operation function of setting the commissioning flag to the steady state flag or the nonsteady state flag may not be based on the steady flag information or the nonsteady flag information, which is output from the engineering apparatus 5. The operation function may be any function as long as the operation function can be used by the operator and is security-protected.

For example, the gateway apparatuses 2 and 3 may include an input unit. If the steady flag information, the identification data of the wireless field device, etc. is input to the input unit before the start of the commissioning of the wireless field device, then the operation control unit 25 turns the commissioning flag of the wireless field device in the instrument commissioning state control table 210 to the steady state flag. The steady flag information turns the commissioning flag to the steady state flag.

If the nonsteady flag information, the identification data of the wireless field device, etc. is input to the input unit before the start of the commissioning of the wireless field device, then the operation control unit 25 turns the commissioning flag of the wireless field device in the instrument commissioning state control table 210 to the nonsteady state flag. The nonsteady flag information turns the commissioning flag to the nonsteady state flag.

If the commissioning of the wireless instrument included in the wireless network has been finished, then the steady flag information is transmitted to the gateway apparatus by using the engineering apparatus 5 to turn the commissioning flag to the steady state flag. Thereby, the commissioning flag is initialized.

If the operation control unit 25 receives the access request information, then the operation control unit 25 determines whether or not the wireless field device that is requested by the access request information is under commissioning.

If the operation control unit 25 determines that the wireless field device is not under commissioning, then the access request information is transmitted to the wireless field device 11, which is requested by the access request information, by controlling the wireless communication unit 24. Also, the control data, which is acquired from the wireless field device 11, is transmitted to the host system 4 by controlling the communication unit 23.

If the operation control unit 25 determines that the wireless field device is under commissioning, then the state of the status information of the control data from the wireless field device, which is requested by the access request information, is changed to nonsteady state by controlling the status output unit 22. Also, both the control data and the status information of the wireless field device, which is in the nonsteady state, associated with the control data are transmitted to the host system 4.

The gateway apparatus 2 may further include a flag management unit 26. The flag management unit 26 acquires the nonsteady flag information or the steady flag information from the wireless field devices 10, . . . , 14 by using a wireless communication etc. For example, the flag management unit 26 may acquire the nonsteady flag information or the steady flag information through the input unit that is included in the gateway apparatus 2 and is not illustrated in the figure. The flag management unit 26 may acquire the nonsteady flag information or the steady flag information from the engineering apparatus 5 through the network 100 and the communication unit 23. If the flag management unit 26 acquires the nonsteady flag information or the steady flag information, then the flag management unit 26 turns or rewrites the commissioning flag of the wireless field device, which is stored in the instrument commissioning state control table 210, to the nonsteady state flag or the steady state flag. Then the commissioning flag is stored in the storage unit 21.

If the flag management unit 26 acquires the nonsteady flag information or the steady flag information, then the flag management unit 26 stores the nonsteady flag information or the steady flag information in the storage unit 21 associated with the identification data of the wireless field device in the instrument commissioning state control table.

The configuration of the gateway apparatus 3 is the same as the configuration of the gateway apparatus 2, and description of the configuration of the gateway apparatus 3 will be omitted.

The operation control unit 25 starts an OS etc. that is stored in the storage unit 21, and executes a program that is stored in the OS. Thereby, the operation control unit 25 controls all of the operations of each apparatus and each unit. Also, the operation control unit 25 controls each operation of each apparatus and each unit. The storage unit 21 may extract programs and applications, which are executed by the operation control unit 25, in a program storage area. The storage unit 21 may temporarily store the input data or data regarding the result of the operation in executing the program and the application.

The operation control unit 25 starts the OS etc. stored in the storage unit 21. The status output unit 22 may read and execute the program and the application that are stored in the OS so as to perform the control.

Each unit described above may be configured by independent devices that are connected mutually by buses.

The host system 4 is a system that performs the control. The host system 4 collects and monitors the control data including the measurement data of the wireless field devices 10, . . . , 19. The host system 4 operates and controls the wireless field devices such as an actuator. For example, the host system 4 may be an instrumentation system that includes DCS (Distributed Control Systems).

The host system 4 includes a control unit 41. If the commissioning flag of the wireless field device associated with the control data is in a nonsteady state, then the control unit 41 discontinues operation of controlling of the control target. Only if the status information of the received control data is in a steady state, the control unit 41 controls the control target based on the control data.

The host system 4 may have any configuration as long as the host system 4 controls the wireless field devices 10, . . . , 19 and performs controlling of the process or monitoring of the measurement data in the control network system.

Operations of Control Network System

Figure 2:
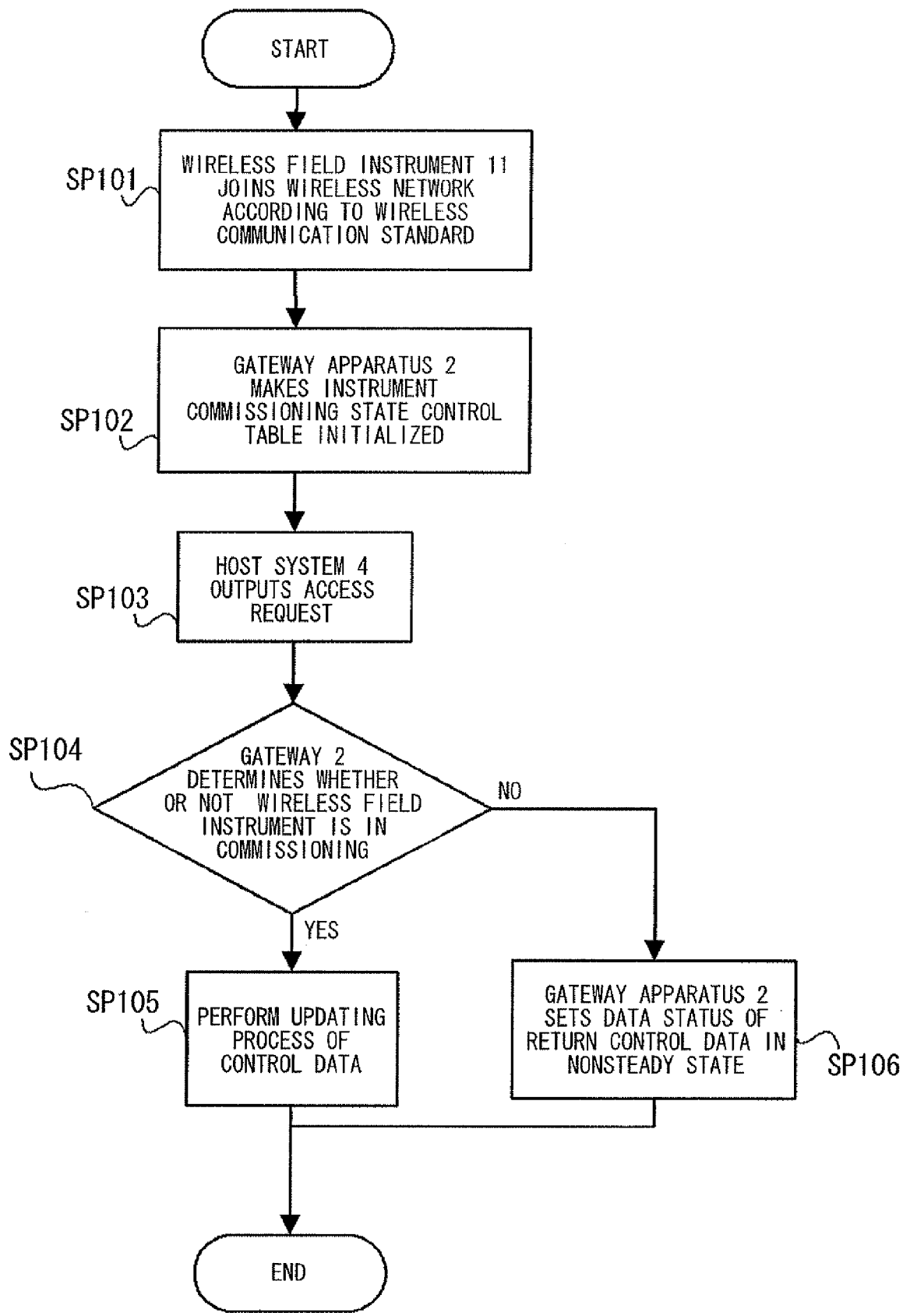
FIG. 2 is a flow chart illustrating an operation of the control network system in accordance with the first preferred embodiment of the present invention.

FIG. 2 is a flow chart illustrating an operation of the control network system in accordance with the first preferred embodiment of the present invention.

In Step SP101, when the wireless field devices 10, . . . , 19 enter a wireless network, which is configured by a plurality of wireless field devices, based on the wireless communication standard such as ISA 100.11a, the wireless field devices 10, . . . , 19 transmit a network ID and a join key to the system manager apparatus, which is not illustrated in the figure, so as to request the system manager apparatus to certify the wireless field device through the gateway apparatuses 2 and 3.

If the system manager apparatus confirms that the wireless field device, which is requested to certify, has already been registered in the system manager apparatus, then the system manager apparatus transmits a response saying that the system manager apparatus accepts the wireless field device into the wireless network. Then the system manager apparatus makes the wireless field device join the wireless network.

In Step SP102, the operation control unit 25 of the gateway apparatus 2 registers or stores the network ID, which is transmitted to the system manager apparatus when the wireless field device joins the wireless network, and the identification data of the wireless field device, to the instrument commissioning state control table. The operation control unit 25 registers or stores the commissioning flag as the nonsteady state flag, which means the wireless field device is under commissioning, and initializes the instrument commissioning state control table.

In Step SP103, the host system 4 outputs the access request information to the wireless field device through the gateway apparatus so as to acquire the control data. For example, the host system 4 outputs the access request information to the wireless field device 11 through the gateway apparatus 2.

In Step SP104, the operation control unit 25 of the gateway apparatus 2 receives the access request information that the host system 4 outputs to the wireless field device so as to acquire the control data, which is transmitted by the control communication on the wireless network. The control communication is generally called the publisher/subscriber communication. If the operation control unit 25 receives the access request information, then the operation control unit 25 determines whether or not the wireless field device is under commissioning, based on the commissioning flag of the wireless field device that is requested by the access request information on the instrument commissioning state control table 210 in the storage unit 21.

If the wireless field device is under commissioning, i.e. the nonsteady state flag is stored in the instrument commissioning state control table 210, then the process proceeds to step SP105.

If the wireless field device has finished commissioning, i.e. the steady state flag is stored in the instrument commissioning state control table 210, then the process proceeds to step SP106.

In Step SP105, the operation control unit 25 controls the wireless communication unit 24, and the gateway apparatus 2 outputs the access request information to the wireless field device 11, which is requested by the access request information. The operation control unit 25 controls the communication unit 23, and the gateway apparatus 2 outputs the control data, which is acquired by the wireless field device 11, to the host system 4.

The status output unit 22 may turn the status information of the control data, which is received from the wireless field device 11, into a steady state. The communication unit 23 may transmit both the control data and the status information of the wireless field device, which is in a steady state and is associated with the control data, to the host system 4.

The host system 4 performs an operation of process control such as update of the control data, based on the received control data.

In Step SP106, the operation control unit 25 controls the status output unit 22, and the gateway apparatus 2 turns the status information of the control data from the wireless field device, which is requested by the access request information, into a nonsteady state. The communication unit 23 transmits both the control data and the status information, which is in a nonsteady state and is associated with the control data, to the host system 4.

The control network system in accordance with the first preferred embodiment of the present invention includes the storage unit, which stores identification data of the wireless field device and stores the commissioning flag that shows the progress state in commissioning of the wireless field device associated with the identification data, and the control unit, which discontinues operation of control of the control target if the commissioning flag of the wireless field device associated with the control data is in a nonsteady state. Thereby, effect by the wireless field device, which is in commissioning, on the process can be reduced. In the control network system in accordance with the first preferred embodiment of the present invention, indefinite data transmission by an unsuitable setting can be prevented according to the process in which completion of commissioning is expressly shown.

In the control network system in accordance with the first preferred embodiment of the present invention, an effect by the wireless field device, which is in a nonsteady state while commissioning, on the process can be reduced even if the network IDs of the wireless networks, which the wireless field devices joins before and after the commissioning, are the same.

In the control network system in accordance with the first preferred embodiment of the present invention, the network IDs, which the wireless field devices joins before and after the commissioning, are not necessarily different. Thereby, an effect by radio wave interference, which is caused by adjacent networks, such as a deficiency of abnormal performance can be reduced.

Figure 3:
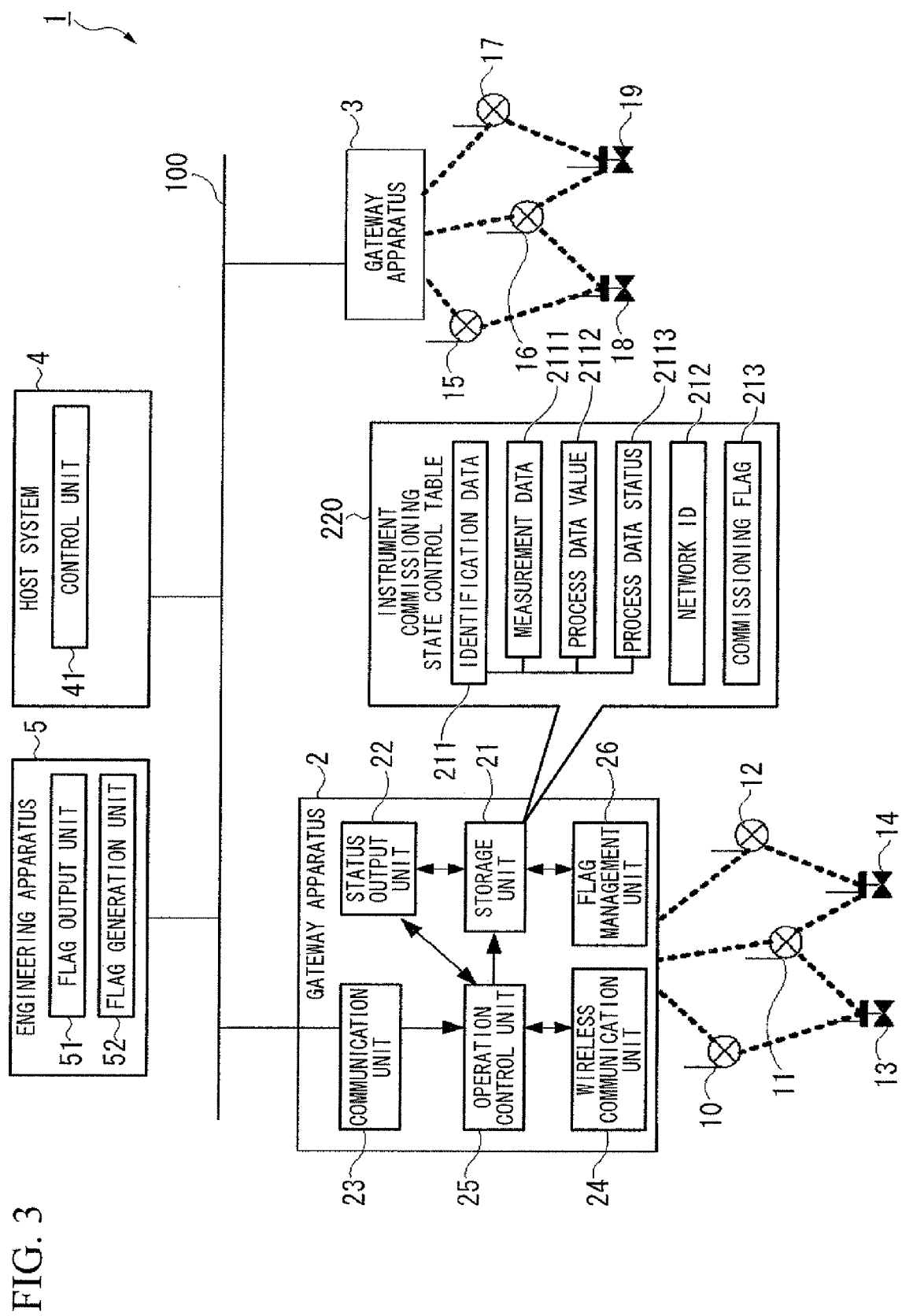
FIG. 3 is a view illustrating a configuration of a control network system in accordance with a second preferred embodiment of the present invention.

Second Preferred Embodiment:

A second preferred embodiment of the present invention will be described. FIG. 3 is a view illustrating a configuration of a control network system in accordance with the second preferred embodiment of the present invention. The storage unit 21 includes an instrument commissioning state control table 220. The instrument commissioning state control table 220 includes areas of measurement data 2111, a process data value 2112, and a process data status 2113 of the wireless field device. Thereby, the control network system in accordance with the second preferred embodiment of the present invention performs a simulating function of the process data under commissioning. Other configurations of the control network system in accordance with the second preferred embodiment of the present invention is the same as the configuration of the control network system in accordance with the first preferred embodiment of the present invention.

In the control network system in accordance with the second preferred embodiment of the present invention, the process data value, which is a target of the simulation, is set by an upper application. If the gateway apparatus receives the access request information to the process data value from other upper applications or the host system 4, then the gateway apparatus returns the process data value instead of real data such as the control data and the process data associated with the wireless field device.

If the gateway apparatuses 2 and 3 receive the access request information from the host system 4, then the gateway apparatuses 2 and 3 return the measurement data, the process data value, and the process data status associated with the wireless field device, which is requested by the access request information, stored in the instrument commissioning state control table 220 of the storage unit 21, to the host system 4 instead of the real data of the wireless field device.

Thereby, if the wireless field device is being adjusted, confirmation of the operation of the control system is performed in parallel.

In the above description of the preferred embodiments of the present invention, the number of the wireless field devices was ten, but the number may be an arbitrary number.

As used herein, the following directional terms "forward, rearward, above, downward, right, left, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," "nearly", and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

The term "unit" is used to describe a component, section or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A control network system that controls a wireless field device which is a control target by using control data, the control network system comprising:

the wireless field device configured to transmit the control data, identification data identifying the wireless field devices, a network ID identifying the wireless network that the wireless field devices join, and a flag which is one of a non-steady state flag showing that the wireless field device is under commissioning and a steady state flag showing that the wireless field device has finished commissioning, through a wireless communication;

a relay apparatus configured to relay the control data from the wireless field device, the identification data, the network ID, and the flag, the relay apparatus comprising a storage unit configured to store an instrument commissioning state control table in which the identification data of the wireless field device, the network ID and the flag are associated with each other; and a host system configured to receive the control data, the identification data, the network ID, and the flag from the wireless field device through the relay apparatus by transmitting access request information that requests the control data from the wireless field device which is the control target, the identification data, the network ID, and the flag to the relay apparatus, the host system comprising a control unit configured to discontinue operation of controlling the wireless field device which is the control target when the flag is in a nonsteady state flag, wherein the relay apparatus is configured to receive access request information, which is output from the host system, and to determine whether or not the wireless field device which is the control target is under commissioning based on the flag of the wireless field device which is the control target, the relay apparatus includes:
- a registration unit configured to store the identification data, the network ID, and the flag while associating them in the storage unit as the instrument commissioning state control table, when the wireless field device enters the wireless network performing the wireless communication;
- a status output unit configured to turn status information of the control data from the wireless field device which is the control target, which is requested by the access request information, into a steady state or a non-steady state based on the flag of the wireless field device when receiving the access request information transmitted from the control unit; and
- a communication unit configured to transmit both the control data of the wireless field device and the status information of the control data to the control unit, and the control unit is configured to discontinue operation of controlling the wireless field device which is a control target based on the status information of the control data from the wireless field device.

2. The control network system according to claim 1, wherein
the flag is one of a nonsteady state flag and a steady state flag, the nonsteady state flag shows that the wireless field device is under commissioning, and the steady state flag shows that the wireless field device has finished commissioning, the relay apparatus further comprises:
a status output unit; and
a communication unit,
wherein if determined that the wireless device is under commissioning, the status output unit is configured to output status information of the control data, which is acquired by the host system based on the access request information, the status information being in the nonsteady state corresponding to the flag of the wireless field device, and
wherein the communication unit is configured to output the control data and the status information of the wireless field device associated with the control data to the host system.

3. The control network system according to claim 2, further comprising:
a flag output unit configured to output one of nonsteady flag information and steady flag information, the nonsteady flag information turning the flag to the nonsteady state flag, the steady flag information turning the flag to the steady state flag; and
a flag generation unit configured to generate the nonsteady flag information before the wireless field device starts commissioning, the flag generation unit generating the steady flag information when the wireless field device has finished commissioning.

4. The control network system according to claim 3, wherein the relay apparatus further comprises:
an input unit configured to receive the nonsteady flag information before the wireless field device starts commissioning, the input unit being configured to receive the steady flag information when the wireless field device has finished commissioning.

5. The control network system according to claim 3, wherein the relay apparatus further comprises:
a flag management unit configured to turn the flag of the wireless field device to the nonsteady state flag when receiving the nonsteady flag information, the flag management unit being configured to turn the flag of the wireless field device to the steady state flag when receiving the steady flag information, the flag management unit being configured to control one of the nonsteady state flag and the steady state flag to be stored in the storage unit associated with the identification data of the wireless field device.

6. The control network system according to claim 1, wherein the control unit is configured to control the control target based on the control data when status information of the control data, which has been received, is in a steady state.

7. The control network system according to claim 2, wherein
the storage unit is configured to store process data associated with the identification data and the nonsteady state flag, the process data having been acquired when the wireless field device is under commissioning, and
the communication unit is configured to transmit the status information and the process data to the host system.

8. The control network system according to claim 1, wherein
the wireless field device is configured to transmit the control data and a network identification through a wireless communication,
the relay apparatus is configured to relay the control data from the wireless field device,
the storage unit is configured to store the network identification and the flag associated with the identification data, and
the wireless field device is configured to communicate with the relay apparatus using the network identification before and after the commissioning.

9. A control network system that controls a plural set of wireless field devices each of which is a control target by using control data, the control network system comprising:
the plural set of wireless field devices, each set comprising one or more wireless field devices, each of which is configured to transmit the control data, identification data identifying the wireless field devices, a network ID identifying the wireless network that the wireless field devices join, and a flag which is one of a non-steady state flag showing that the wireless field device is under commissioning and a steady state flag showing that the wireless field device has finished commissioning, through a wireless communication;

a plurality of relay apparatuses, each of which is configured to relay the control data from a corresponding set of the one or more wireless field devices, the identification data, the network ID, and the flag, each of the plurality of relay apparatuses comprising a storage unit configured to store an instrument commissioning state control table in which the identification data of the wireless field device, the network ID and the flag are associated with each other; and a host system that is connected to the plurality of relay apparatuses through a network, the host system being configured to receive the control data, the identification data, the network ID, and the flag from the wireless field device through a corresponding one of the plurality of relay apparatuses by transmitting access request information that requests the control data from the wireless field device which is the control target, the identification data, the network ID, and the flag to the relay apparatus, the host system comprising a control unit configured to discontinue operation of controlling the wireless field device which is the control target when the flag is in a nonsteady state flag, wherein each of the plurality of relay apparatuses is configured to receive access request information, which is output from the host system, and to determine whether or not each of the wireless field devices which is the control target is under commissioning based on the flag of the wireless field device which is the control target, the relay apparatus includes:
  a registration unit configured to store the identification data, the network ID, and the flag while associating them in the storage unit as the instrument commissioning state control table, when the wireless field device enters the wireless network performing the wireless communication;
  a status output unit configured to turn status information of the control data from the wireless field device which is the control target, which is requested by the access request information, into a steady state or a non-steady state based on the flag of the wireless field device when receiving the access request information transmitted from the control unit; and
  a communication unit configured to transmit both the control data of the wireless field device and the status information of the control data to the control unit, and
the control unit is configured to discontinue operation of controlling the wireless field device which is a control target based on the status information of the control data from the wireless field device.

10. The control network system according to claim 9, wherein
the flag is one of a nonsteady state flag and a steady state flag, the nonsteady state flag shows that the wireless field device is under commissioning, and the steady state flag shows that the wireless field device has finished commissioning,
each of the plurality of relay apparatuses further comprises:
a status output unit; and
a communication unit,
wherein if determined that the wireless field device is under commissioning, the status output unit is configured to output status information of the control data, which is acquired by the host system based on the access request information, the status information being in the nonsteady state corresponding to the flag of the wireless field device, and
wherein the communication unit is configured to output the control data and the status information of the wireless field device associated with the control data to the host system.

11. The control network system according to claim 10, further comprising:
  a flag output unit configured to output one of nonsteady flag information and steady flag information, the nonsteady flag information turning the flag to the nonsteady state flag, the steady flag information turning the flag to the steady state flag; and
  a flag generation unit is configured to generate the nonsteady flag information before the wireless field device starts commissioning, the flag generation unit being configured to generate the steady flag information when the wireless field device has finished commissioning.

12. The control network system according to claim 11, wherein the relay apparatus further comprises:
  an input unit configured to receive the nonsteady flag information before the wireless field device starts commissioning, the input unit being configured to receive the steady flag information when the wireless field device has finished commissioning.

13. The control network system according to claim 11, wherein each of the plurality of relay apparatuses further comprises:
  a flag management unit configured to turn the flag of the wireless field device to the nonsteady state flag when receiving the nonsteady flag information, the flag management unit being configured to turn the flag of the wireless field device to the steady state flag when receiving the steady flag information, the flag management unit being configured to control one of the nonsteady state flag and the steady state flag to be stored in the storage unit associated with the identification data of the wireless field device.

14. The control network system according to claim 9, wherein the control unit is configured to control the control target based on the control data when status information of the control data, which has been received, is in a steady state.

15. The control network system according to claim 10, wherein
  the storage unit is configured to store process data associated with the identification data and the nonsteady state flag, the process data having been acquired when the wireless field device is under commissioning, and
  the communication unit is configured to transmit the status information and the process data to the host system.

16. A control method that controls a wireless field device which is a control target by using control data, the control data being transmitted by a wireless field device through a wireless communication, the control method comprising:
  acquiring identification data identifying the wireless field devices and a network ID identifying the wireless network that the wireless field devices join through a wireless communication from the wireless field device;
  generating a flag which is one of a non-steady state flag showing that the wireless field device is under commissioning and a steady state flag showing that the wireless field device has finished commissioning;
  storing an instrument commissioning state control table in which the identification data of the wireless field device, the network ID and the flag are associated with each other;

discontinuing operation of controlling the wireless field device which is the control target when the flag is in a nonsteady state;

receiving access request information that requests the control data from the wireless field device which is the control target, the identification data, the network ID, and the flag; and determining whether or not the wireless field device which is the control target is under commissioning based on the flag of the wireless field device which is the control target; and turning status information of the control data from the wireless field device which is the control target, which is requested by the access request information, into a steady state or a non-steady state based on the flag of the wireless field device when receiving the access request information.

17. The control method according to claim 16, wherein the flag is one of a nonsteady state flag and a steady state flag, the nonsteady state flag shows that the wireless field device is under commissioning, and the steady state flag shows that the wireless field device has finished commissioning.

18. The control method according to claim 17, further comprising:

generating nonsteady flag information before the wireless field device starts commissioning, the nonsteady flag information turning the flag to the nonsteady state flag; and generating steady flag information when the wireless field device has finished commissioning, the steady flag information turning the flag to the steady state flag.

19. The control method according to claim 18, further comprising:

turning the flag of the wireless field device to the nonsteady state flag when receiving the nonsteady flag information; and turning the flag of the wireless field device to the steady state flag when receiving the steady flag information.

20. The control method according to claim 16, further comprising:

transmitting the control data and a network identification through a wireless communication;

relaying the control data from the wireless field device;

storing the network identification and the flag associated with the identification data; and communicating with a relay apparatus using the network identification before and after the commissioning.

* * * * *